United States Patent [19]

Rodaway

[11] 4,319,381
[45] Mar. 16, 1982

[54] SHOCK ABSORBING CASTOR

[75] Inventor: Keith S. Rodaway, Santa Monica, Calif.

[73] Assignee: Everest & Jennings, Inc., Los Angeles, Calif.

[21] Appl. No.: 167,822

[22] Filed: Jul. 14, 1980

[51] Int. Cl.³ ............................................. A47B 91/00
[52] U.S. Cl. ......................................................... 16/44
[58] Field of Search ................................... 16/44, 18 R

[56] References Cited

U.S. PATENT DOCUMENTS

| | | | |
|---|---|---|---|
| 2,051,627 | 8/1936 | Weinmann | 16/44 |
| 2,350,624 | 6/1944 | McDaniel | 16/44 |
| 2,472,686 | 6/1949 | Snyder | 16/44 |

*Primary Examiner*—Doris L. Troutman
*Attorney, Agent, or Firm*—Ralph B. Pastoriza

[57] ABSTRACT

The forward castor wheels for wheelchairs are each provided with shock absorbing leaf springs concealed within the fork frame structure rotatably mounting the wheels. The normal swivel shaft rather than connecting directly to the fork frame passes through an enlarged opening in the upper portion of the frame and terminates in a cross member pivoted to the upper portions of the fork arms so that the fork frame and wheel can execute slight rocking movements relative to the swivel shaft. The leaf springs pass down inside the fork arms, the upper ends of the leaf springs being secured to the cross member and the lower ends bearing against inwardly directed projections on the inside of the fork arms to bias the fork relative to the swivel shaft. The leaf springs will absorb shocks experienced by the castor wheels such as occur when passing over cracks in sidewalks and the like to thereby greatly increase the riding comfort of the wheelchair.

4 Claims, 4 Drawing Figures

SHOCK ABSORBING CASTOR

This invention relates generally to castor wheels and more particularly to an improved shock absorbing castor wheel for wheelchairs.

BACKGROUND OF THE INVENTION

Conventional wheelchairs include forward castor wheels generally of much smaller diameter than the principal side wheels of the chair itself. While the major portion of the weight of a patient is supported by the large side wheels of the wheelchair, some weight nevertheless is borne by the forward castor wheels. Because these wheels are of relatively smaller diameter than the main wheels, imperfections in the sidewalk or ground over which the wheelchair is riding such as in the form of cavities or ridges have a far greater effect than the larger wheels. Even such small imperfections as the cracks in a sidewalk can result in an annoying transmitting of shocks through the forward castor wheels to the entire wheelchair frame and over long periods of time, can become quite annoying to a patient.

The foregoing problem could be overcome if the castor wheels could be shock-mounted in some manner. While it is known to provide swivel type castor wheels with shock mounts in the form of coil springs and the like, for uses other than wheelchairs, to try to adapt such mountings as are known to wheelchairs would not only be awkward but would be unsightly in appearance and questionable in value. In this respect, it should be understood that adjacent to the forward castor wheels are the normal foot rests which in turn are mounted to the wheelchair frame proper in such a manner as to enable their being pivoted out-of-the-way or even removed from the wheelchair. Any type of shock absorbing mounting for the castor wheels must thus not interfere with normal operation of the footrests, which would mean that such mountings would have to be on the exterior sides of the wheels. In this latter event, the overall width of the wheelchair would be increased rendering it difficult to pass through narrow passageways.

BRIEF DESCRIPTION OF THE PRESENT INVENTION

With the foregoing considerations in mind, the present invention contemplates the provision of an improved shock absorbing castor particularly useful for wheelchairs wherein appropriate shock absorbing spring means are provided to absorb shocks from cavities and ridges along the passageway but wherein the overall dimensions of the wheel and frame structure are not increased nor is any unsightly structure evident.

Briefly, and in accord with the preferred embodiment of this invention, the castor includes a castor wheel with a fork frame rotatably mounting the wheel. A vertical swivel shaft for coupling to the wheelchair at its upper end extends into the top portion to an opening of the fork and terminates in a cross member pivoted to the inside upper ends of the arms of the fork. The fork frame and wheel can thus rock about a pivot axis above and forward of and parallel to the axis of rotation of the wheel. Leaf springs in turn connect between the cross member and the fork frame arms in a manner to bias the fork frame in a direction to move the axis of the castor wheel into closer vertical alignment with the axis of the swivel shaft to effectively raise or increase the distance between the castor wheel and the wheelchair. The castor wheel is thus resiliently mounted and will absorb shocks transmitted to the wheel and thereby minimize such shocks being transmitted to the wheelchair frame.

Because the leaf springs pass downwardly within the arms of the fork, they are completely concealed and the structure of the castor wheel itself is not increased in exterior dimensions nor is the overall appearance of the castor wheel appreciably altered.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
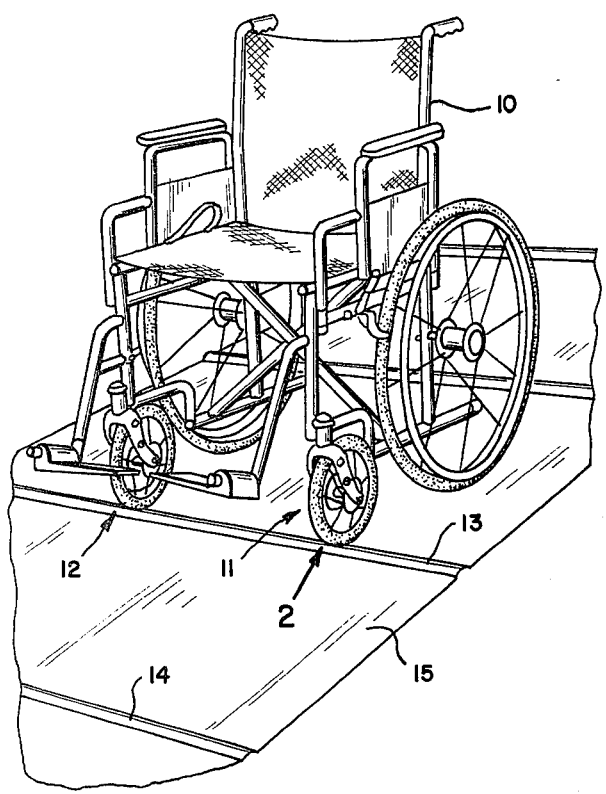
FIG. 1 is a perspective view of a wheelchair incorporating the shock absorbing castor wheels of this invention.

Referring first to FIG. 1, there is shown a wheelchair 10 having front castor wheels 11 and 12 designed in accord with the present invention. More particularly, each of the castor wheels 11 and 12 incorporates shock absorbing means to cushion shocks transmitted to the wheelchair through the castor wheels as might occur when the wheelchair is rolled over cracks such as indicated at 13 and 14 in a sidewalk 15.

With respect to the foregoing, smaller diameter wheels such as characterize the front castor wheels of the wheelchair cannot absorb shocks or roll over cavities and ridges as easily as large diameter wheels such as the side wheels for the wheelchair 10. Consequently, any means for absorbing shocks experienced by the smaller diameter front castor wheels would contribute greatly to a more comfortable ride for the patient in the wheelchair.

Figure 2:
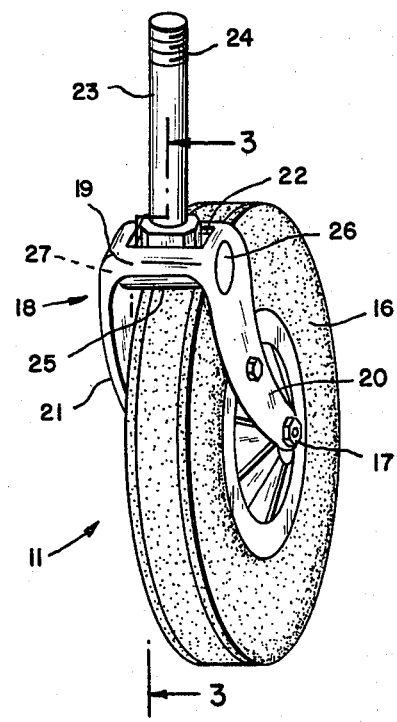
FIG. 2 is an enlarged perspective view of one of the castor wheels on the wheelchair of FIG. 1.

Referring now to FIG. 2, there is shown an enlarged perspective view of the front castor wheel 11 for the wheelchair of FIG. 10. Since the front castor wheel 12 is essentially identical in construction, a detailed description of the castor wheel 11 will suffice for both.

Referring specifically to FIG. 2, the shock absorbing castor includes a wheel 16 having an axle 17 mounted to an appropriate fork frame indicated generally by the numeral 18.

Fork frame 18 has an upper portion 19 and downwardly and rearwardly extending arms 20 and 21 straddling the wheel 16 as shown, the end portions of the arms connecting to the axle 17 to rotatably mount the wheel to the arms. The upper portion 19 has a top opening 22.

A swivel shaft 23 has an upper portion 24 for reception in an appropriate journal in the wheelchair 10 of FIG. 1 and a lower portion extending downwardly through the opening 22 to terminate in a cross member 25 underlying the upper portion 19 of the fork frame. Cross member 25 lies generally parallel to the axle 17 of the wheel and is journalled at opposite ends within journal openings 26 and 27 formed on the upper portion of the arms 20 and 21. The size of the top opening 22 is larger than the cross sectional area of the swivel shaft 23 so that the shaft 23 and cross member 25 can rock back and forth relative to the fork frame 19 through a slight angle.

Figure 3:
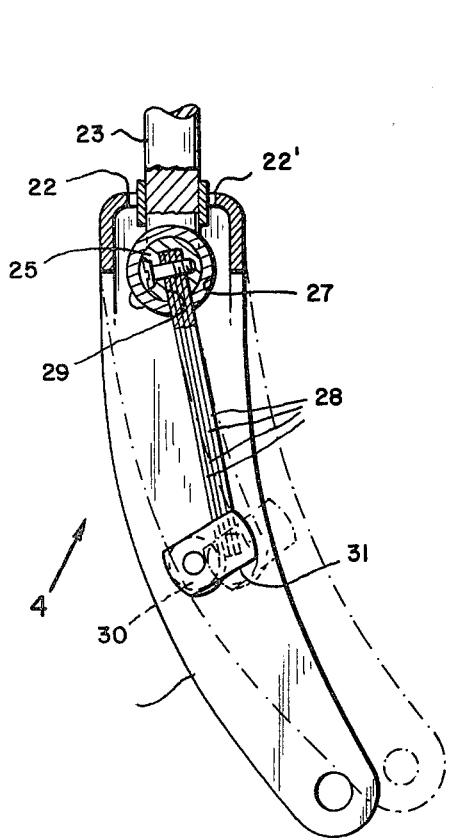
FIG. 3 is a fragmentary cross section taken in the direction of the arrows 3—3 of FIG. 2; and, FIG. 4 is an enlarged exploded fragmentary perspective view of various components of the castor wheel looking generally in the direction of the arrow 4 of FIG. 3.

Referring now to the fragmentary cross section of FIG. 3, there is shown a leaf spring means made up of a plurality of individual leaf springs 28 having upper ends fixed within an appropriate slot opening 29 in one end of the cross member 25 and the other free lower ends extending downwardly and rearwardly along the inside of the fork frame arm 21 to terminate in positions intermediate the extreme lower and upper ends of the arm 21. At this position for the arm 21, there is provided a stop projection 30 terminating in an end keeper flange 31 against which the downwardly extending free ends of the leaf springs bear so that the arm 21 is biased in a forward and downward direction relative to the swivel shaft 23 and cross member 25.

The action of this biasing will be understood by considering the shaft 23 in FIG. 3 as being held in a secure stationary vertical position. Under such circumstances, the cross member 25 is similarly held in a fixed stationary position so that the free ends of the leaf springs 28 bearing against the projection 30 on the arm 21 will tend to rock the arm about the journal opening 27 connecting to the cross member 25 until the forward side of the top opening 22 in the fork frame engages the portion of the swivel shaft 23 passing through this opening. Since the opening is larger than the cross section of the swivel shaft 23 there is left a gap 22' on the opposite side of the swivel shaft as shown in FIG. 3.

If now the castor wheel should experience a shock, the fork frame is free to move upwardly through a small vertical distance and simultaneously rearwardly to the dotted line position illustrated in FIG. 3 wherein the force is absorbed by further bending of the leaf springs 28. In other words, the shock experienced by the wheel will be absorbed by movement of the fork relative to the swivel shaft 23 rather than communicated directly to the wheelchair.

Figure 4:
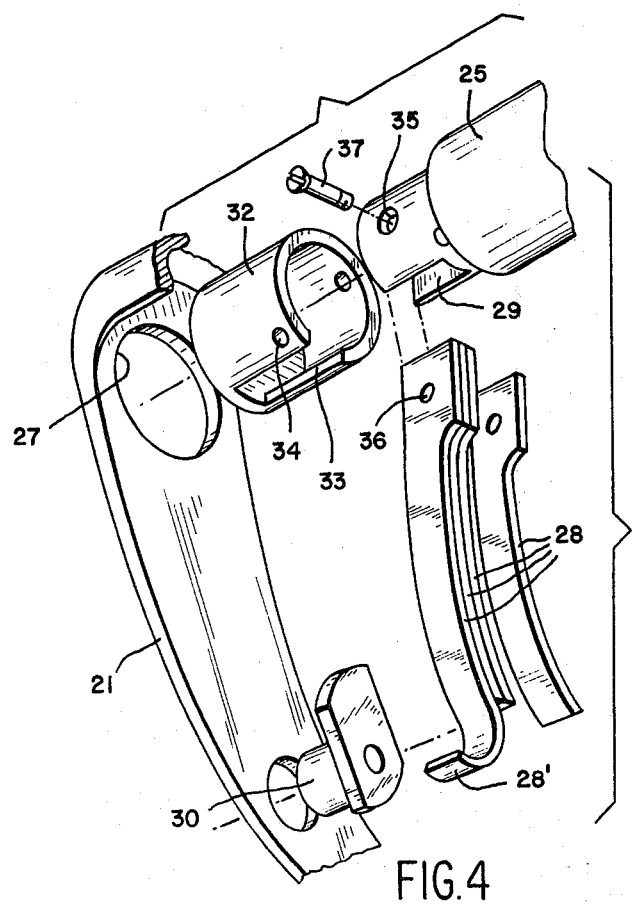

Referring now to FIG. 4, some further details of the preferred form of the leaf spring structure will be evident.

Considering first the securement of the upper ends of the various leaf springs as indicated by the exploded presentation in FIG. 4, there is provided a sleeve 32 having a slot 33 arranged to register with the slot 29 when the sleeve 30 is received on the end of the cross member 25. Set screw 34 locks the sleeve to the cross member. The end portion of member 25, in turn, includes a bore 35 registering with openings 36 in the leaf springs for securement by a screw 37 when in the slot. By this arrangement, the sleeve 30 can be removed and additional leaf springs added to increase the biasing force of the leaf springs and thus accommodate heavier patients in a wheelchair or, alternatively, remove some of the leaf springs where the load is lighter.

Referring to the lower exploded portion of FIG. 4, it will be noted that the initial leaf spring of the various leaf springs 28 has its lower free end bent to form a hook portion 28' arranged to engage partially circumferentially about the projection 30 between the inside portion of the arm 21 and the keeper flange 31. The remaining leaf springs will simply bear against this initial leaf spring.

It will be understood that the other arm of the frame structure designated 20 in FIG. 2 will have similar leaf springs exerting a biasing force against that arm to provide for a balanced biasing of the fork arms relative to the swivel shaft 23.

Referring back to FIG. 3 once again, it will be noted that the intermediate position of the termination points of the leaf springs 28 with respect to the arms 21 is approximately midway between the upper and lower ends of the arms. By providing the stop projection 30 for the free ends of the leaf springs 28 at this mid position, it will be clear that movement of the extreme lower end of the arm where it connects to the wheel axle 17 will be approximately twice the movement of the free ends of the springs. Similarly, the force necessary to move the extreme end of the arm is approximately half of the force necessary to move the free ends of the springs so that appropriate cushioning can be carefully controlled and yet the entire shock absorbing mechanism remain in a fairly compact configuration.

In further respect of the foregoing, it will be appreciated that by bringing the leaf springs down inside of the fork frame arms, the same is substantially concealed so that there is no unsightly structure and the castor wheels themselves appear as conventional castor wheels. Also, because of this design, there is no increase in width of the castor wheels nor is any auxiliary or exterior structure necessary. Yet, desired shock absorbing properties are automatically incorporated by the unique leaf spring configuration all as described.

I claim:

1. A shock absorbing castor for a wheelchair including:
   (a) a castor wheel;
   (b) a fork frame rotatably mounting the wheel;
   (c) a vertical swivel shaft for coupling to the wheelchair at its upper end, said shaft terminating at its lower end in a cross member pivoting said fork frame for swinging movement relative to said shaft about an axis above and forward of and parallel to the axis of rotation of said wheel; and;
   (d) leaf springs secured at upper ends to said cross member and extending down inside said fork frame on either side of the castor wheel, said fork frame having inwardly directed projections against which the lower ends of the leaf springs bear to thereby bias said fork frame in a direction to move the axis of said wheel into closer vertical alignment with the axis of said swivel shaft to thereby effectively increase the distance between the castor wheel and wheelchair, whereby shocks experienced by said wheel are absorbed by movement of the wheel against the bias of the spring means.

2. In combination, a wheelchair having shock absorbing front castor wheels, each castor wheel including:
   (a) a wheel having an axle;
   (b) a fork frame having an upper portion and downwardly and rearwardly extending arms straddling said wheel, the end portions of the arms connecting to said axle to rotatably mount the wheel to said arms, the upper portion having a top opening;
   (c) a swivel shaft having an upper end for reception in said wheelchair, said shaft passing downwardly through said opening and terminating in a cross member underlying said upper portion generally parallel to the axle of said wheel, said cross member having opposite ends journalled for rotation in the upper end portions of said arms, said top opening being larger than the cross sectional area of said swivel shaft so that rocking movement of said swivel shaft relative to said arms can take place about said journals through said top opening;

(d) leaf spring means having fixed upper ends secured to said cross member and free lower ends extending downwardly and rearwardly along the insides of said arms to terminate in positions intermediate the lower and upper ends of the arms; and, (e) stop projections at said positions extending inwardly from said arms against which the lower free ends of the spring means bear so that said arms are biased in a forward and downward direction relative to said swivel shaft and cross member whereby shocks experienced by said wheel are at least partially absorbed in said leaf spring means.

3. The subject matter of claim 2, in which said leaf spring means includes a plurality of individual side-by-side leaf springs whereby individual leaf springs can be removed or added to vary the force of biasing depending upon the weight of a patient who will be using said wheelchair to optimize the shock absorption capabilities of the castor wheels.

4. The subject matter of claim 3, in which said positions intermediate the upper and lower ends of said arms are approximately mid-position so that movement of the ends of said arms are approximately twice the movement of the free ends of said springs whereby a mechanical advantage accrues insofar as cushioning movement of the wheel takes place as compared to the necessary accommodating movement of the springs.

* * * * *